(12) United States Patent
Kuo

(10) Patent No.: US 7,267,236 B2
(45) Date of Patent: Sep. 11, 2007

(54) WATER TREATMENT DEVICE

(75) Inventor: Yu-Shan Kuo, Taichung (TW)

(73) Assignee: Chichang Kuo, Taichung (TW)

( * ) Notice: Subject to any disclaimer, the term of this patent is extended or adjusted under 35 U.S.C. 154(b) by 246 days.

(21) Appl. No.: 11/171,073

(22) Filed: Jun. 30, 2005

(65) Prior Publication Data

US 2006/0237358 A1   Oct. 26, 2006

(51) Int. Cl.
*B01D 35/22* (2006.01)
*B01D 29/54* (2006.01)
*B01D 65/02* (2006.01)
*B01D 63/08* (2006.01)

(52) U.S. Cl. .................... 210/415; 210/409; 210/332; 210/321.63; 210/321.69

(58) Field of Classification Search ............... 210/415, 210/409, 332, 321.63, 321.69
See application file for complete search history.

(56) References Cited

U.S. PATENT DOCUMENTS

| | | | | |
|---|---|---|---|---|
| 1,219,796 | A * | 3/1917 | Atkins ................... 210/360.2 |
| 3,285,417 | A * | 11/1966 | Schmidt Jr, et al. ........ 210/777 |
| 3,680,702 | A * | 8/1972 | Weinstein .................. 210/798 |
| 5,019,255 | A * | 5/1991 | Dahlquist et al. ........... 210/225 |
| 5,254,250 | A * | 10/1993 | Rolchigo et al. ...... 210/321.67 |
| 5,679,249 | A * | 10/1997 | Fendya et al. ......... 210/321.63 |
| 6,117,322 | A * | 9/2000 | Miller et al. .......... 210/321.63 |
| 6,461,507 | B1 * | 10/2002 | Ishigaki et al. ........ 210/333.01 |
| 6,613,226 | B2 * | 9/2003 | Kuo ........................... 210/225 |
| 2005/0040096 | A1 * | 2/2005 | Kuo ....................... 210/323.1 |
| 2005/0161390 | A1 * | 7/2005 | Kuo ........................... 210/347 |

* cited by examiner

Primary Examiner—Thomas M. Lithgow
(74) Attorney, Agent, or Firm—Bliss McGlynn, P.C.

(57) ABSTRACT

A water treatment device includes a container, a longitudinal water collecting tube, a filter unit, and a plurality of longitudinal water jet tubes. The longitudinal water collecting tube is mounted within the container, and has a tube wall formed with a plurality of water inlet slots. The filter unit includes a stack of alternately disposed filter membranes and rotatable blade scrapers inside the container. Each of the filter membranes and rotatable blade scrapers has a central hole for extension of the longitudinal water collecting tube therethrough. The longitudinal water jet tubes are provided around the filter unit, and are substantially parallel to the longitudinal water collecting tube. Each of the longitudinal water jet tubes has a longitudinal slit facing toward the filter unit.

6 Claims, 8 Drawing Sheets

WATER TREATMENT DEVICE

BACKGROUND OF THE INVENTION

1. Field of the Invention

The invention relates to a water treatment device, more particularly to a water treatment device which can effectively wash and clean impurities on a filter unit that is contained therein.

2. Description of the Related Art

A conventional water filter device disclosed in Taiwanese Patent No. 221,424 includes a top cover, a bottom cover, and a stack of alternately disposed filter units and stirring members between the top and bottom covers. Each of the filter units has an annular filtering film. The top cover is provided with two side holes for injecting water therethrough. Each of the stirring members includes an inner supporting ring, an outer supporting ring, and a stirring element anchored between the inner and outer supporting rings. The stirring element has a plurality of angularly spaced apart curved ribs. During use, water is injected into the water filter device through the side holes in the top cover to stir the stirring members so that the impurities on the filtering films can be removed by the curved ribs of the stirring elements.

Although the aforesaid conventional water filter device can achieve the effect of cleaning the filtering films, it still has the following shortcomings that need to be overcome. Since the stirring elements are actuated by water injected through the side holes in the top cover, and since water pressure is decreased gradually along a direction from the top cover to the bottom cover, the stirring elements at the lower part of the conventional water filter device may have insufficient stirring speed to clean the adjacent filtering films, and may even stop stirring. Therefore, the cleaning effect of the stirring members of the conventional water filter device is not satisfactory. Furthermore, each stirring element is anchored between the corresponding inner and outer supporting rings. The friction forces between the stirring element and the inner supporting ring and between the stirring element and the outer supporting ring may interfere with stirring activity of the stirring element. Therefore, a relatively high water pressure is required to drive stirring of the stirring elements. Moreover, the filter units in the conventional water filter device are not encapsulated by a container and are instead simply clamped between the top and bottom covers. Therefore, the water spurting due to the stirring of the stirring elements during the cleaning process can moisten the area around the water filter device. Additionally, the water filter device may be contaminated by the dust therearound.

SUMMARY OF THE INVENTION

Therefore, the object of this invention is to provide a water treatment device that can overcome the aforesaid drawback associated with the prior art.

The water treatment device according to this invention includes a container, a longitudinal water collecting tube, a filter unit, and a plurality of longitudinal water jet tubes. The longitudinal water collecting tube is mounted within the container, and has a tube wall formed with a plurality of water inlet slots. The filter unit includes a stack of alternately disposed filter membranes and rotatable blade scrapers inside the container. Each of the filter membranes and rotatable blade scrapers has a central hole for extension of the longitudinal water collecting tube therethrough. The longitudinal water jet tubes are provided around the filter unit, and are substantially parallel to the longitudinal water collecting tube. Each of the longitudinal water jet tubes has a longitudinal slit facing toward the filter unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
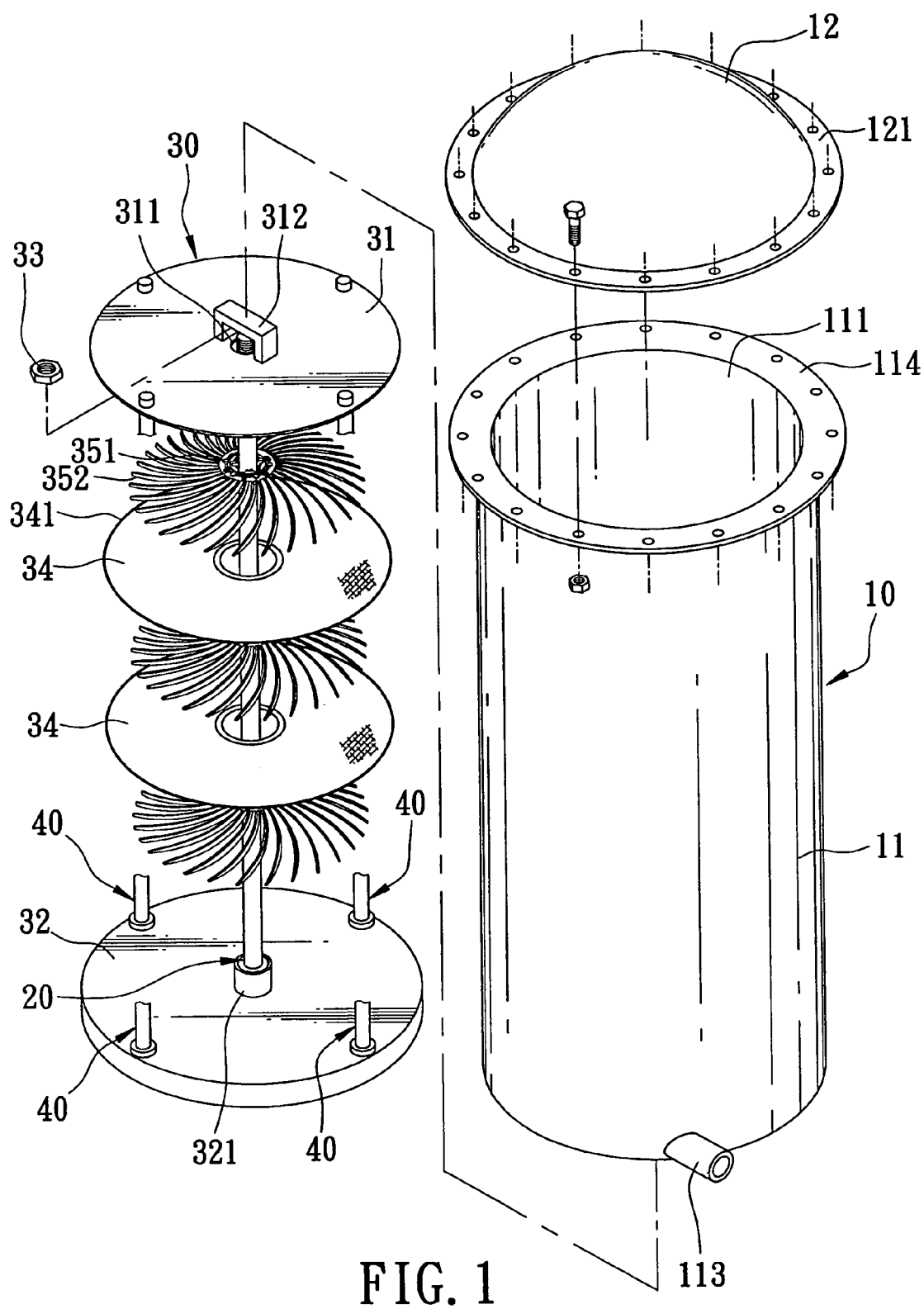
FIG. 1 is an exploded perspective view of the preferred embodiment of the water treatment device according to this invention.
Figure 2:
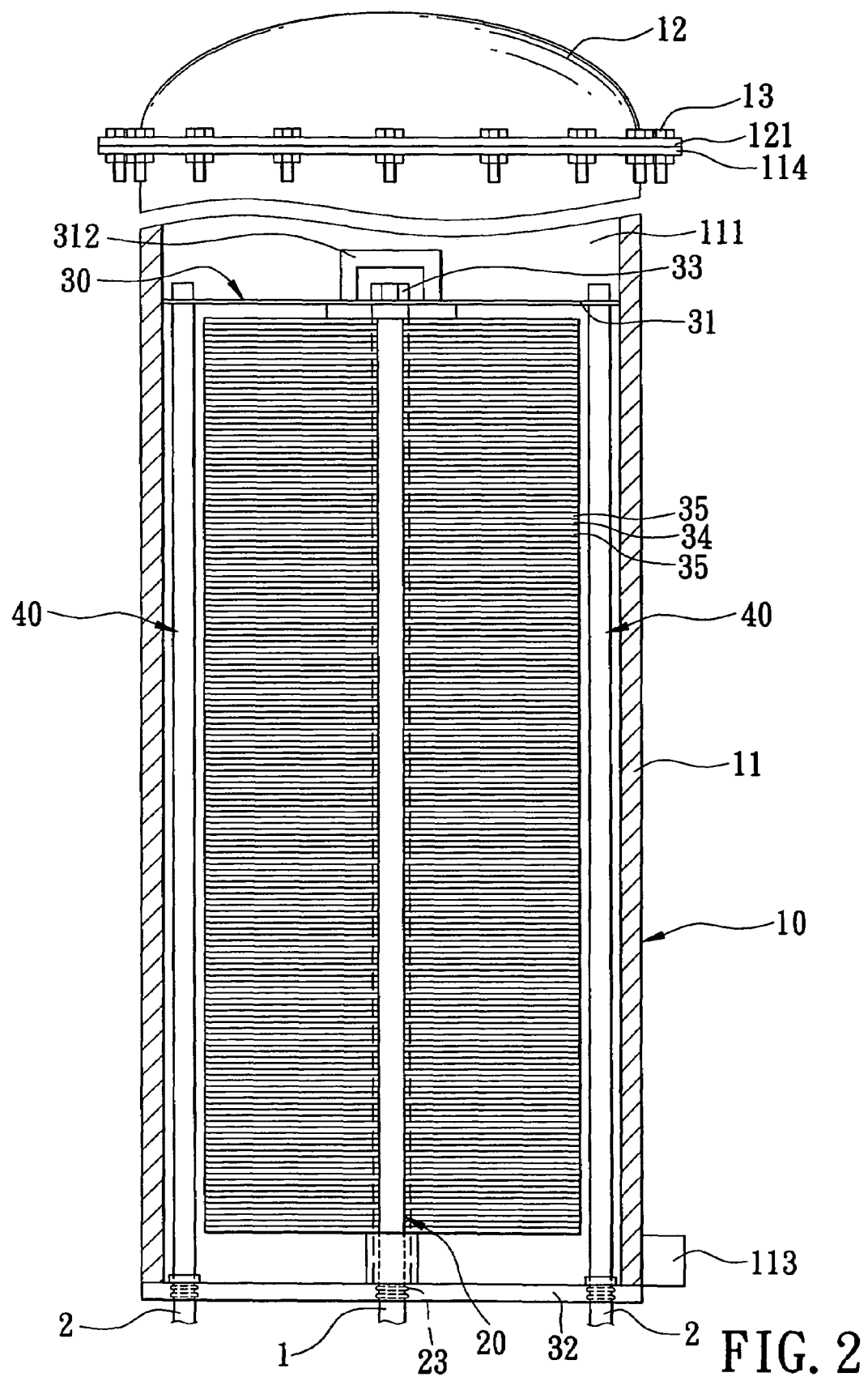
FIG. 2 is a fragmentary partly sectional view of the preferred embodiment.
Figure 3:
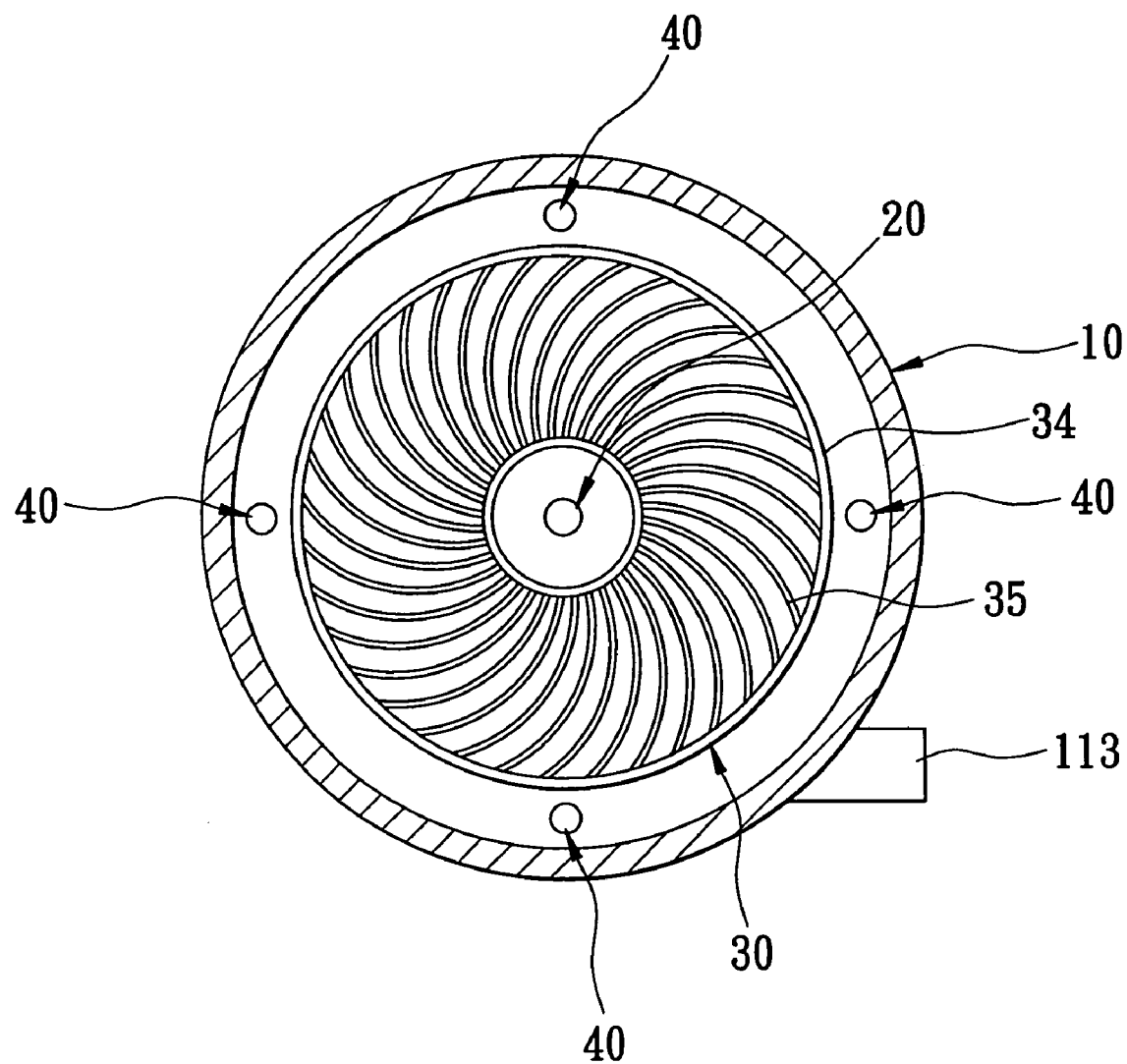
FIG. 3 is another sectional view of the preferred embodiment.

Referring to FIGS. 1, 2 and 3, the preferred embodiment of a water treatment device according to this invention is shown to include a container 10, a longitudinal water collecting tube 20, a filter unit 30, and a plurality of longitudinal water jet tubes 40.

The container 10 includes a peripheral wall 11, a cap 12 covering a top end of the peripheral wall 11, and a plurality of lock bolt and nut units 13 for locking the cap 12 to the top end of the peripheral wall 11. The peripheral wall 11 defines a receiving space 111, and has a discharge hole 113 at a lower portion thereof and a flange 114 at the top end thereof. The cap 12 has a flange 121 corresponding to the flange 114 of the peripheral wall 11. The flange 121 of the cap 12 is locked to the flange 114 of the peripheral wall 11 thorough the lock bolt and nut units 13. The cap 12 is further provided with a pressure releasing valve (not shown) for releasing air from the container 10 when the air pressure in the container 10 is beyond a desirable level. Additionally, the container 10 is further provided with a water output tube 1 at a center of a bottom end thereof, and a plurality of water input tubes 2 at sides of the bottom end thereof.

Figure 4:
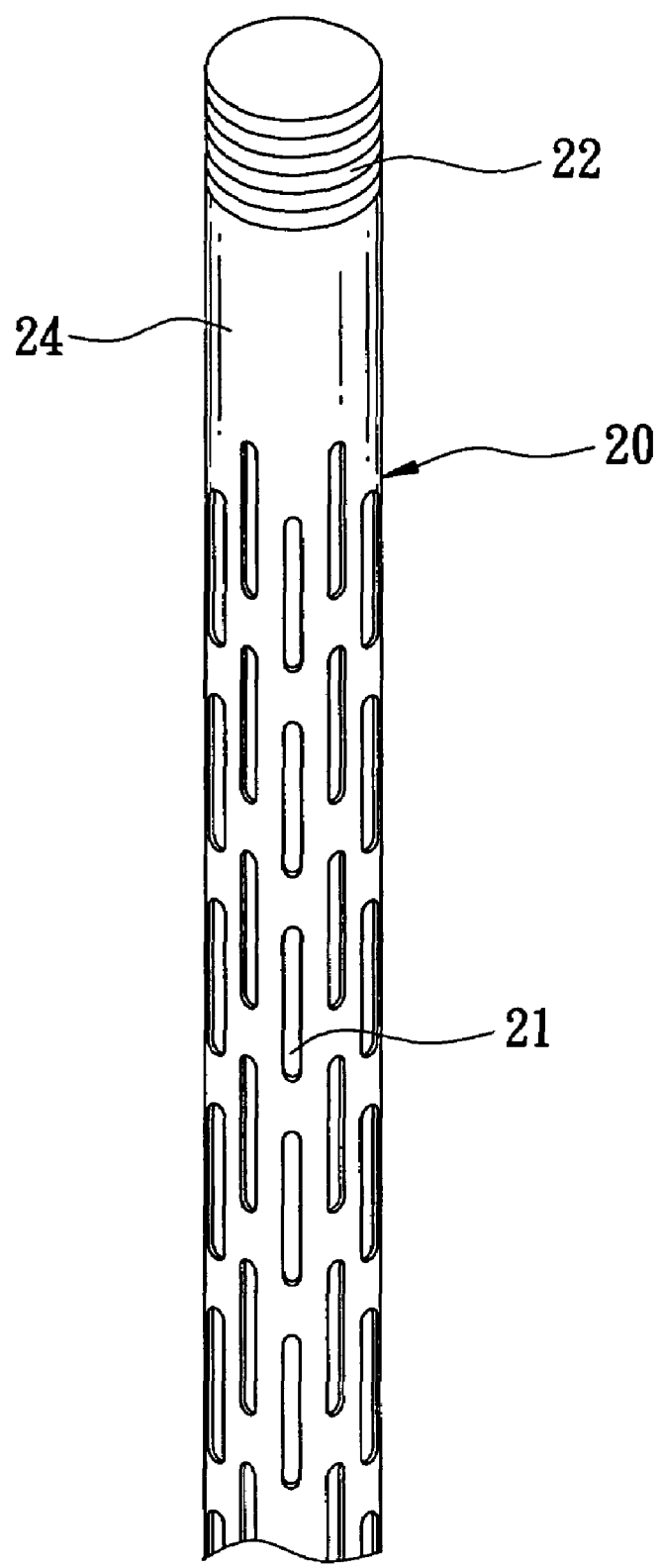
FIG. 4 is a fragmentary perspective view of a longitudinal water collecting tube used in the preferred embodiment.

Referring to FIG. 4, the longitudinal water collecting tube 20 is mounted within the container 10, and has a tube wall 24 formed with a plurality of water inlet slots 21, a threaded portion 22 at a top end thereof, and a locking portion 23 at a bottom end thereof. The locking portion 23 of the longitudinal water collecting tube 20 is locked to the water output tube 1 so as to establish fluid communication with the water output tube 1.

Referring again to FIGS. 1, 2 and 3, the filter unit 30 is mounted in the receiving space 111 of the container 10, and includes a stack of alternately disposed filter membranes 34 and rotatable blade scrapers 35, a top press plate 31, a bottom press plate 32, and a nut 33. The filter members 34 and the rotatable blade scrapers 35 are clamped between the top and bottom press plates 31,32. The nut 33 engages the threaded portion 22 of the longitudinal water collecting tube 20 to press the top press plate 31 against the filter membranes 34 and the rotatable blade scrapers 35. The top press plate 31 has a central hole 311 for enabling the longitudinal water collecting tube 20 to extend through the top press plate 31. The bottom press plate 32 is provided with a sleeve 321 for enabling the locking portion 23 of the longitudinal water collecting tube 20 to extend therethrough. The top press plate 31 is further provided with a hanging portion 312 formed in a reverse U-shape and mounted at a center thereof. Each of the filter membranes 34 and the rotatable blade scrapers 35 has a central hole for extension of the longitudinal water collecting tube 20 therethrough. Each of the filter membranes 34 has a waterproofing edge 341 so as to permit water to flow toward the central holes of the filter membranes 34.

Figure 5:
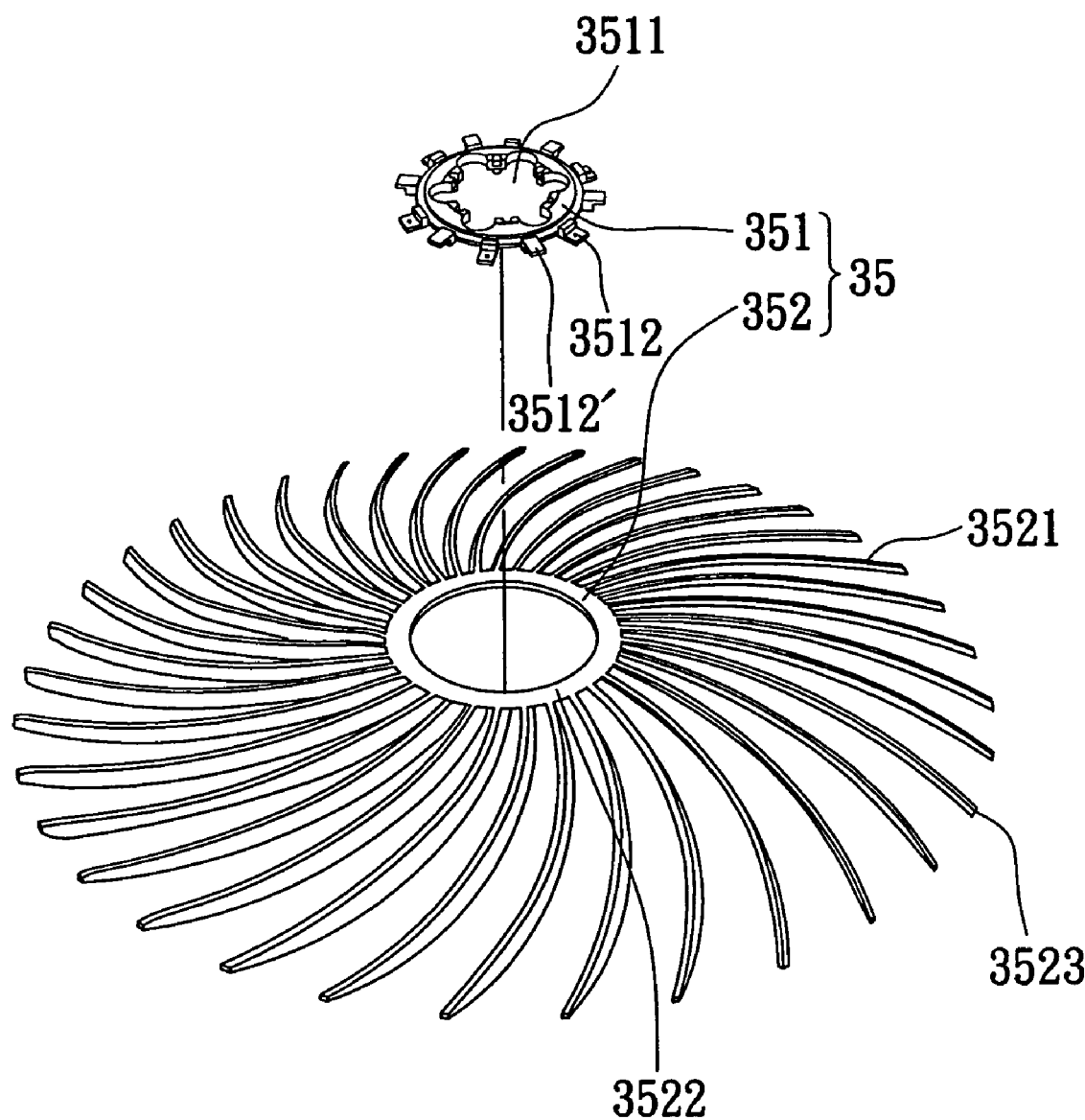
FIG. 5 is an exploded perspective view of a rotatable blade scraper used in the preferred embodiment.

Referring to FIG. 5, each of the rotatable blade scrapers 35 includes a support ring 351 and a blade unit 352. The support ring 351 has a central hole 3511 for enabling the longitudinal water collecting tube 20 to extend therethrough, and a plurality of alternately arranged L-shaped first and second guiding blocks 3512, 3512' formed along an outer periphery of the support ring 351. The blade unit 352 has a plurality of angularly spaced apart curved blade elements 3521 and a single ring 3522 interconnecting inner ends of the blade elements 3521. The curved blade elements 3521 have free ends 3523 which are disconnected from each other. The single ring 3522 is anchored on the support ring 351 through the first and second guiding blocks 3512,2512' so that the blade unit 352 is rotatable around the support ring 351.

Figure 6:
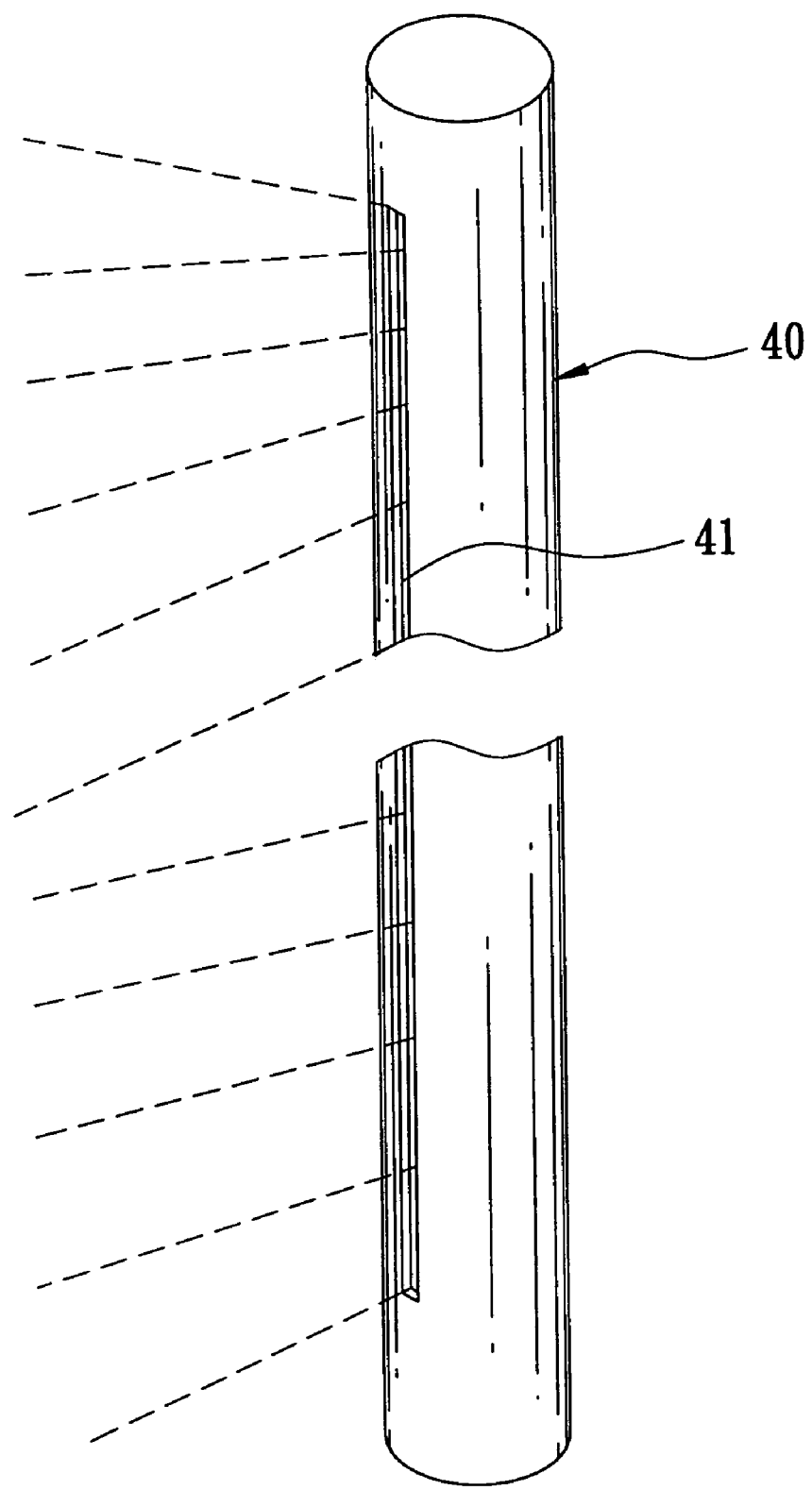
FIG. 6 is a fragmentary perspective view of a longitudinal water jet tube used in the preferred embodiment.

Referring again to FIGS. 2 and 3, the longitudinal water jet tubes 40 are provided around the filter unit 30, and are substantially parallel to the longitudinal water collecting tube 20. Each of the longitudinal water jet tubes 40 is locked to a corresponding one of the water input tubes 2. Referring to FIG. 6, each of the longitudinal water jet tubes 40 has a longitudinal slit 41 facing toward the filter unit 30 so that the water that enters into the longitudinal water jet tubes 40 can be ejected toward the filter unit 30. It should be noted that each of the longitudinal water jet tubes 40 is locked rotatably to the corresponding one of the water input tubes 2 so as to adjust the orientation of the longitudinal slit 41 of each of the longitudinal water jet tubes 40.

Figure 7:
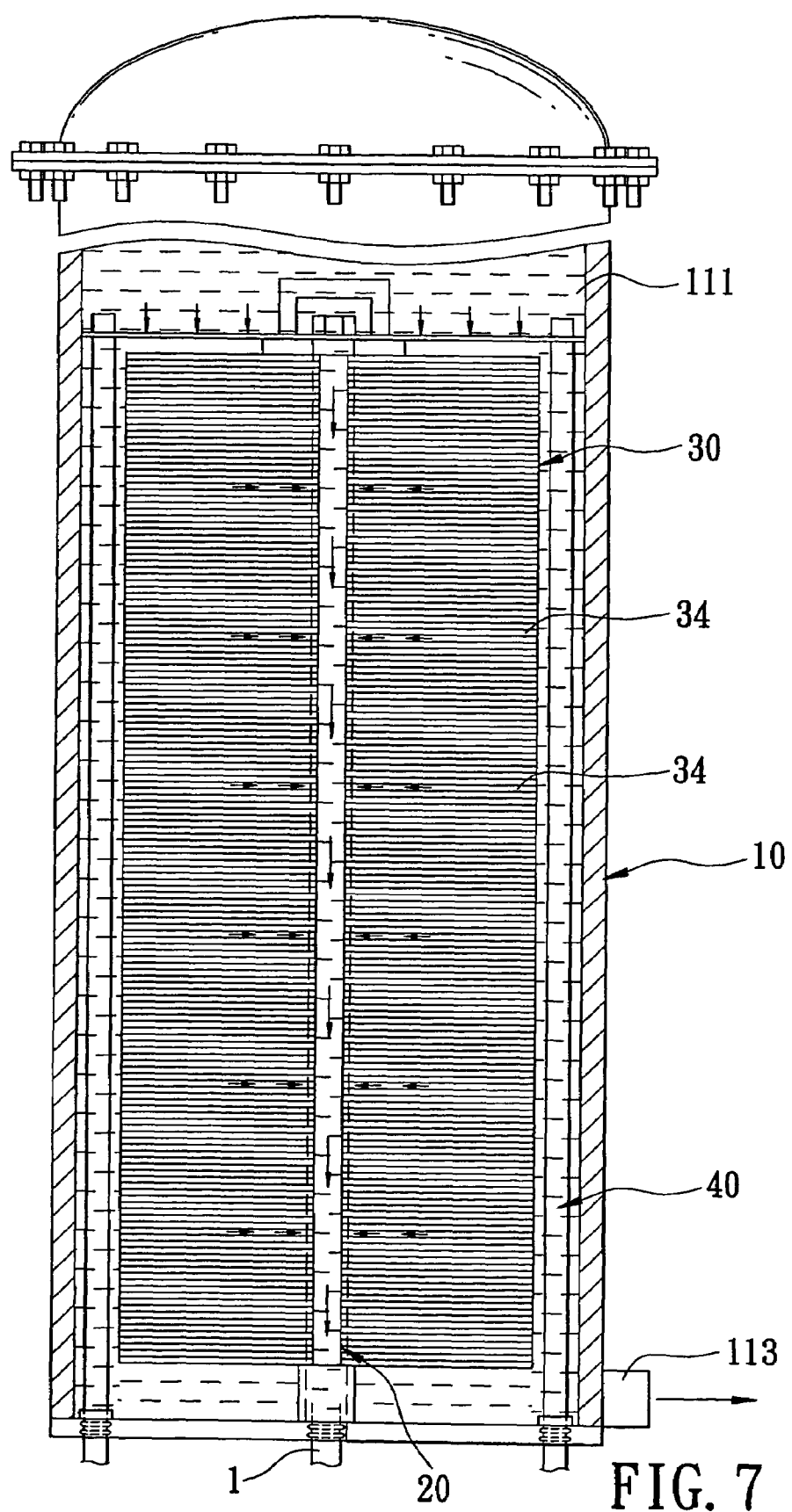
FIG. 7 is a fragmentary partly sectional view illustrating a filtering process of the preferred embodiment.

Referring to FIG. 7, during filtering of raw water, the raw water is transported into the receiving space 111 of the container 10 through the longitudinal water jet tubes 40, and passes through the filter membranes 34 of the filter unit 30 to obtain filtered water, which then flows into the longitudinal water collecting tube 20 through the water inlet slots 21 and is transported out of the water treatment device through the longitudinal water collecting tube 20 and the water output tube 1 for further processing. The waste water remaining in the receiving space 111 can be transported out of the container 10 through the discharge hole 113.

Figure 8:
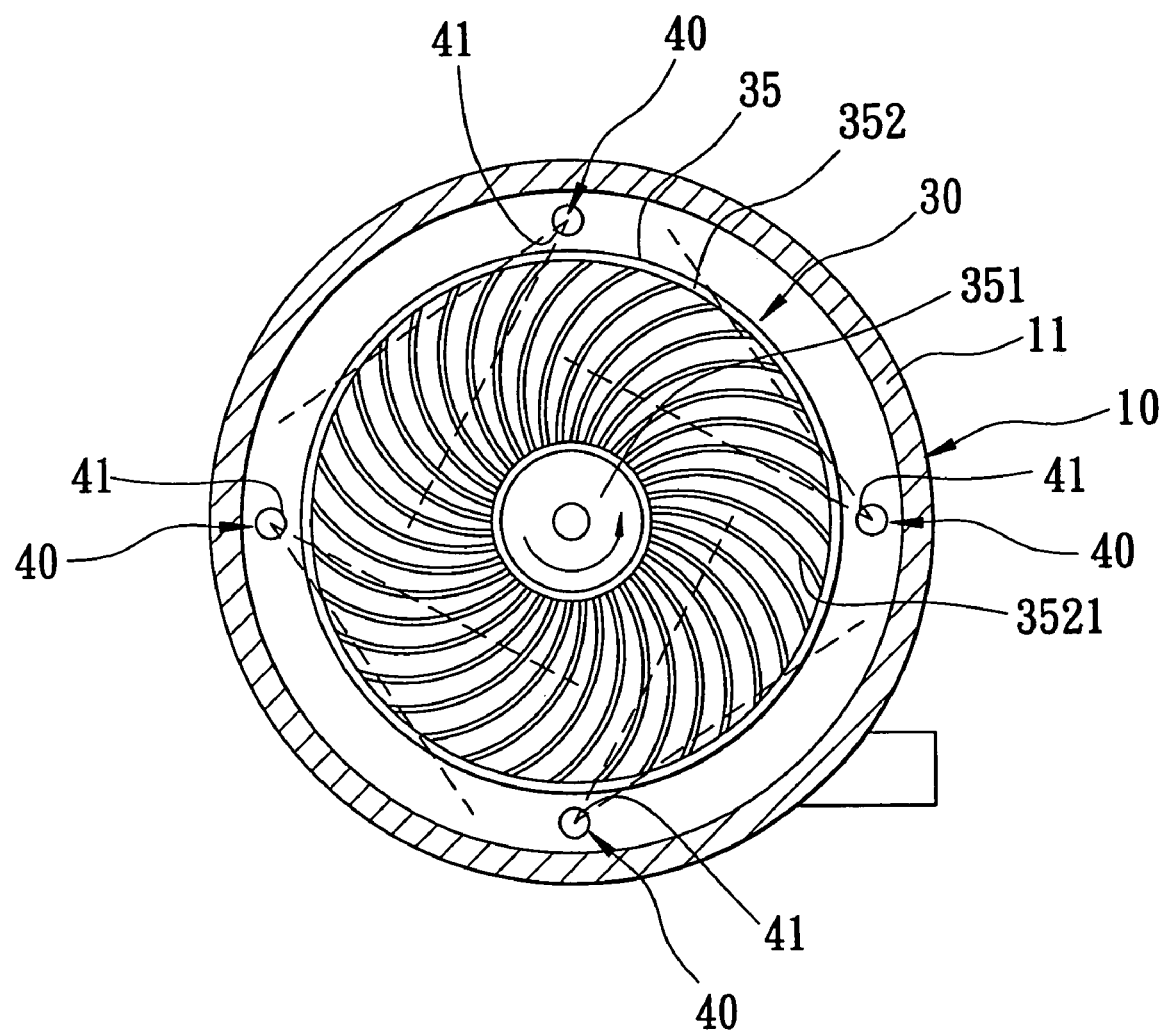
FIG. 8 is a schematic sectional view illustrating a cleaning process of the preferred embodiment.

Referring to FIG. 8, during cleaning of the filter membranes 34, jets of water are ejected out of the longitudinal water jet tubes 40 through the longitudinal slits 41 toward the blade elements 3521 of the blade units 352. Therefore, the blade units 352 can be rotated easily so as to remove the impurities on the filter membranes 34 effectively. Referring again to FIG. 7, since the longitudinal slits 41 of the longitudinal water jet tubes 40 extend along a major portion of the longitudinal length of the container 10, the blade units 352 of the rotatable blade scrapers 35 can be rotated evenly and effectively so as to achieve an effective cleaning effect for the filter membranes 34. Furthermore, since the container 10 is provided in the water treatment device of the present invention, the problems of water spurting and dust contamination encountered in the prior art can be avoided. Moreover, since the blade units 352 are anchored rotatably by mere use of the support rings 351, the friction problem of the prior art can be reduced.

In view of the aforesaid, the aforesaid drawbacks associated with the prior art can be overcome by the water treatment device of the present invention.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A water treatment device, comprising:
   a container;
   a longitudinal water collecting tube mounted within said container and having a tube wall formed with a plurality of water inlet slots;
   a filter unit including a stack of alternately disposed filter membranes and rotatable blade scrapers inside said container, each of said filter membranes and rotatable blade scrapers having a central hole for extension of said longitudinal water collecting tube therethrough; and
   a plurality of longitudinal water jet tubes provided around said filter unit and substantially parallel to said longitudinal water collecting tube, each of said longitudinal water jet tubes having a longitudinal slit facing toward said filter unit.

2. The water treatment device as claimed in claim 1, wherein said container includes a peripheral wall and a discharge hole provided in said peripheral wall.

3. The water treatment device as claimed in claim 1, wherein each of said rotatable blade scrapers includes a support ring, and a blade unit having a plurality of angularly spaced apart curved blade elements and a single ring interconnecting inner ends of said blade elements, said single ring being anchored on said support ring, said curved blade elements having free ends which are disconnected from each other.

4. The water treatment device as claimed in claim 1, wherein said filter unit further includes a top press plate and a bottom press plate clamping said filter membranes and said rotatable blade scrapers therebetween, said filter unit further including a nut engaging a top end of said longitudinal water collecting tube to press said top press plate against said filter membranes and said rotatable blade scrapers.

5. The water treatment device as claimed in claim 4, wherein said top press plate includes a hanging portion mounted at a center thereof.

6. The water treatment device as claimed in claim 2, wherein said container further includes a cap covering a top end of said peripheral wall.

* * * * *